United States Patent Office 3,595,806
Patented July 27, 1971

3,595,806
METHOD FOR THE PRODUCTION OF ACTIVATED CARBON BY PARTIAL OXIDATION OF ATOMIZED CELLULOSE PULPING LIQUOR
Steven Prahacs, Dollard des Ormeaux, Quebec, Hugh G. Barclay, Dorval, Quebec, and Jean J. O. Gravel, Montreal, Quebec, Canada, assignors to Pulp and Paper Research Institute of Canada, Pointe Claire, Quebec, Canada
Filed Nov. 27, 1968, Ser. No. 779,578
Claims priority, application Canada, Aug. 21, 1968, 28,069
Int. Cl. C01b *31/08*
U.S. Cl. 252—421          28 Claims

ABSTRACT OF THE DISCLOSURE

A process for the production of finely divided carbon, activatable by aqueous and/or acid leaching, from concentrated spent pulping liquor in a single high temperature stage which process comprises passing the spent liquor under pressure through at least one atomizing nozzle into a reactor chamber to form at least one high velocity atomizet spray of finely divided liquid droplets intimately admixed with a free oxygen containing gas in an amount sufficient to effect a selected partial oxidation of the carbonaceous material in said liquor, said reaction chamber being maintained at a high temperature sufficient to effect said selected partial oxidation, each atomized spray being passed in said chamber through an open-ended tube substantially coaxial with said spray and spaced from but adjacent to each spray nozzle to cause recirculation, by induction of a portion of the hot gaseous products of said partial oxidation to said spray adjacent said nozzle whereby to maintain the reaction temperature of said partial oxidation of the carbonaceous material in said liquor.

The present invention relates to the production of finely divided activated carbon and in particular to an improved method of producing activated carbon from concentrated spent pulping liquors obtained in the pulping of cellulosic plant materials, such as wood, bamboo, bagasse and straw, in which method finely divided activated carbon is produced in a single high temperature stage followed by aqueous and/or acid leaching of said finely divided carbon.

The most widely used method at the present time for producing finely divided activated carbon from spent pulping liquors and particularly from spent pulping liquors derived from the sodium base pulping of wood, is by high temperature processing in a plurality of stages, the first stage being a high temperature carbonization step which is followed by one or more high temperature activation steps, these latter steps being carried out on the leached but relatively inactive carbon obtained in the first high temperature stage. Thus in the known method the spent pulping liquor is first evaporated to 50 to 70% solids concentration by means of multiple-effect evaporators with or without additional evaporation in direct-contact type evaporators prior to being fed to a carbonization furnace suitably of the rotary type in which the organic material contained in the spent liquor solids is incompletely combusted to produce a coarse carbonaceous solid residue of "black ash" composed mainly of sodium carbonate, sodium sulphide and carbon with lesser amounts of sodium sulphate and other compounds. The carbon is recovered from the "black ash" residue by a counter-current multi-stage water leaching step to produce a slurry of carbon which is insufficiently active and it is necessary to effect one or more further high temperature processing steps to activate the carbon. These further high-temperature processing steps require additional furnaces and also require gases such as oxygen, steam or carbon dioxide used either singly or in combination, to achieve this activation and it will be readily seen that these additional high-temperature processing steps besides increasing the cost of the activated carbon also involve additional loss of carbon.

The present invention provides an improved process for the production of finely divided activated carbon from spent pulping liquors involving only a single high temperature processing step and in a particular embodiment thereof is thermally self-sufficient, said thermal self-sufficiency being maintained by partial oxidation of the organic content of the said spent pulping liquor.

It has now been found according to the present invention that it is possible to provide activated finely divided carbon in a single high temperature stage from spent pulping liquor by injecting said pulping liquor into a reactor chamber maintained at high temperature through at least one atomizing nozzle to form at least one high velocity atomized very finely divided liquid spray intimately admixed with a free oxygen containing gas supplied to the nozzle zone in an amount sufficient to effect selective partial oxidation of the organic material in said liquid, each atomized spray being passed into said chamber through an open-ended tube substantially coaxial with the said spray and spaced from but adjacent to each spray nozzle to cause recirculation by induction of a portion of the hot gaseous products of said partial oxidation to said spray adjacent to the nozzle. The recirculation of a portion of the hot gaseous product of the partial oxidation of the atomized spent pulping liquor to a point adjacent that at which the spray leaves the nozzle is sufficient to maintain the required temperature in the zone of oxidation and thus facilitate the evaporation and subsequent partial oxidation of the atomized droplets of spent pulping liquor to produce finely divided carbon which is readily activatable by merely an aqueous and/or acid leaching thereof and which does not need any further high temperature treatment to effect activation thereof.

According to the present invention therefore there is provided a process for the production of finely divided carbon, activatable by aqueous leaching from a concentrated spent pulping liquor in a single high temperature stage which process comprises passing the spent liquor through at least one atomizing nozzle into a reactor chamber to form at least one high velocity atomized spray of finely divided liquid droplets intimately admixed with a free oxygen containing gas in an amount sufficient to effect a selected patrial oxidation of the organic material in said liquid, said reaction chamber being maintained at a high temperature sufficient to effect said selective patrial oxidation, each atomized spray being passed into said chamber through an open-ended tube substantially coaxial with said spray and spaced from but adjacent to each spray nozzle to cause recirculation, by induction, of a portion of the hot gaseous products of said partial oxidation to each spray adjacent said nozzle whereby to maintain the reaction temperature of said partial oxidation of the organic material in said liquor. The products of the partial oxidation occurring in the reaction chamber are a finely divided solid residue which is withdrawn for further processing from said chamber and a hot gaseous product of the reaction which is a mixture of water vapour and various gases and it is critical to the process of the present invention in order to produce the finely divided carbon which is activatable by aqueous leaching in a single stage that a portion of the hot product gases from the partial oxidation is recirculated to the immediate vicinity of the liquid feed spray jet so as to maintain the required temperature in the zone of oxidation and assist in the rapid evaporation and subsequent partial oxidation of the atomized droplets of the concentrated spent liquor spray. This is achieved according to the present invention by directing each liquor spray through an open-ended induction tube concentric with the centerline of each liquid spray orifice and situated close to its outlet orifice from the nozzle so as to envelope but not to impede the free issuance of the liquid spray. The presence of the open-ended induction tube which may be a cylindrical tube or which may be venturi shaped or any other suitable shape assists in the recirculation of the hot gases from near the central zone of the reactor chamber to the zone in the immediate vicinity of the spray issuing from the nozzle, the driving force for the hot gas recirculation being provided by the induction effect of the high velocity gas liquid spray issuing from each nozzle.

According to one embodiment of the present invention the spent pulping liquor may be injected into the reactor chamber in the form of an atomized spray in a substantially but not necessarily exactly radial and horizontal direction from one or more nozzles in the side of the reactor chamber which is suitably circular in horizontal cross section. The nozzles are distributed preferably in an even manner around the circumference of the side wall of the chamber at one or more levels, the nozzles having their outlet orifices substantially even with the inside surface of the wall of the chamber or protruding a short distance beyond said wall into the chamber. Alternatively, according to another embodiment of the present invention the nozzles may be located in an insulated top cover on the chamber which is preferably flat, the nozzles being preferably evenly positioned in such a manner that their axes are vertical and again the outlet orifices of said nozzles are desirably substantially flush with the underside of the cover or protrude a short distance beyond the underside of the cover into the chamber.

The high velocity spray of spent pulping liquor intimately admixed with the oxygen containing gas may be achieved by feeding the spent liquor and an atomizing gas through the atomising nozzle such as pneumatic atomizing spray nozzles positioned in the top and/or in the sides of the reactor chamber using a suitable gas for atomization. The atomizing gas should be supplied at a pressure sufficiently high to assure adequate atomization of the pulping liquor. The atomizing gas may be a non-reactive gas, such as steam, whose sole purpose is to atomize the pulping liquor into a spray in which case an oxygen containing gas such as air or oxygen is introduced independently into the spray in the chamber to obtain intimate admixture with the droplets of pulping liquor and is suitably introduced at a point adjacent to the emission of the spray from the nozzle into the chamber. Alternatively, the atomizing gas may contain in part or consist of the oxygen containing gas used in the partial oxidation of the carbonaceous material in the pulping liquor.

In order to obtain carbon activatable merely by aqueous and/or acid leaching the reactor chamber should suitably be maintained at a temperature in the range 650° to 1000° C. the actual temperature being dependent to a great extent on the composition of the inorganic portion of the solids in the pulping liquor fed to the chamber as an atomized spray. When a sodium based spent liquor or a spent pulping liquor mixture containing more than 1% by weight of sodium or potassium is fed into the chamber the temperature of the chamber is desirably maintained in the range 650 to 850° C. and more preferably in the range 700 to 800° C. When a calcium-, magnesium- or ammonia-based spent pulping liquor or a mixture thereof is sprayed into the chamber the temperature of the chamber is preferably maintained in the range 700 to 1000° C. and more preferably in the range 800 to 950° C. Initially the above temperatures may be attained in the chamber by burning auxiliary fuel through the nozzles and/or through suitably located additional burners. The burning of the auxiliary fuel may be stopped immediately before or at the time of starting to feed the spent liquor into the chamber. The chamber should be preferably operated at temperatures below the fusion or softening temperature of the inorganic fraction of the unleached carbonaceous product and thus the temperature is to some extent, as aforesaid, a function of the type of spent liquor being fed to the chamber. Sodium-based spent liquors produce a solid product (particularly at a high degree of gasification, that is at low active carbon yields) which soften at approximately 800 to 850° C. but it is found that the sodium-based spent liquors can produce at operating temperatures below 800° C. finely divided carbon of generally high activity. Further, additives such as salts of calcium and magnesium and spent liquors containing these two elements tend to raise the softening point of the inorganic fraction of the unleached carbonaceous products derived from sodium-based spent liquors when added thereto prior to the spent liquor being sprayed into the high temperature reactor chamber. Thus such spent liquors desirably contain a minimum of 1% by weight calcium or magnesium. Calcium-, magnesium- or ammonia-based spent liquors or mixtures thereof tend to produce finely divided carbon which is considerably less active than that derived from the sodium based spent pulping liquor under the same process conditions such as temperature and solids content of the spent pulping liquor. Additives which tend to raise the activity of the finely divided carbon such as sodium and potassium salts or mixtures thereof or sodium-based spent pulping liquors may be added to the aforesaid calcium, magnesium or ammonia-based spent liquors, prior to their being fed to the reactor chamber and such spent liquor mixture desirably contains a minimum of 1% by weight sodium or potassium. As the solid residue of carbonaceous material produced by the process of the present invention from calcium-, magnesium- or ammonia-based spent pulping liquors or mixtures thereof have relatively high softening points even with the addition of sodium or potassium additives thereto it is possible to maintain the temperature in the reactor chamber at the highest temperatures required to produce finely divided carbon having exceptional high activity albeit lower yields since a higher fraction of the combustible organic matter in the feed material must be oxidized to produce the higher temperatures required. The highest measurable temperature in the reactor chamber should with these liquors suitably be in the range 700 to 1000° C. and preferably 800 to 950° C.

The pressure in the reactor chamber is suitably kept between 10 to 30 lbs. per sq. in. absolute and more preferably between 14 and 16 lbs. per sq. in. absolute, i.e. close to atmospheric pressure. In order to obtain a high velocity spray in the chamber the atomizing gas is suitably fed into the nozzles at an absolute pressure of preferably greater than twice the absolute pressure in the reactor chamber. Thus the pressure is desirably in the range 20 to 250 p.s.i.a. and more preferably in the range 30 to 150 p.s.i.a. to ensure both adquate atomization of the spent liquor and adequate recirculation of the hot gasses produced by the partial oxidation from the center of the reactor chamber to a point adjacent the nozzle by means of the aforementioned induction tube.

In order to facilitate maintaining the desired temperature in the reactor chamber the atomizing gas and/or oxygen containing gas can be preheated and thus the temperature of the atomizing gas and/or the oxygen containing gas is suitably in the range 20 to 500° C. and preferably in the range of 100 to 300° C. Preheating the concentrated spent pulping liquor sprayed into the chamber through the atomizing nozzles and the temperature is suitably in the range of 50 to 200° C. but preferably in the range 100 to 150 C.

The total solids concentration of the concentrated spent pulping liquor may suitably vary between 50 and 75% by weight and is preferably in the range of 65 to 75% by weight. The oxygen required for the partial oxidation of the organic material in the spent pulping liquor, which may be supplied as air or oxygen in the atomizing gas fed to the atomizing nozzle or as a separate stream of air or oxygen fed to the reactor chamber through separate injection devices or as a combination of the two forms of injection, is present in an amount in the reactor chamber so that the proportion of oxygen relative to the spent pulping liquor is sufficient to maintain by the partial oxidation a temperature level inside the reactor chamber which results in a final finely divided carbon product of acceptable activity, the finely divided active product being obtained after leaching of the solid carbonaceous residue removed from the reactor chamber. The proportion must however be insufficient to oxidize or gasify completely the carbonaceous matter contained in the spent pulping liquor fed to the chamber and it will be readily apparent that the activity and yield of the activated carbon is a function of the independent operating variables of the high temperature reactor chamber such as composition of the spent pulping liquor, the solids concentration of the spent pulping liquor, the feed rate of the spent pulping liquor to the chamber, the temperature of the spent pulping liquor, the rate of injection and the temperature of the atomizing gas, and the air or oxygen, the pressure of the atomizing gas, and the pressure inside the reactor. The temperature attained or maintained inside the reactor chamber and the average residence or retention time of the carbonaceous products in the chamber are also important process variables that are only indirectly controlled or adjusted by varying the aforesaid independent variables. The proportion or air and/or oxygen to the spent pulping liquor fed to the reactor chamber in the case of typical spent liquors of solids concentration of 50 to 75% by weight will normally be such as to correspond to 25 to 50% of the stoichiometric air or oxygen required for full oxidation of the organic content of the spent pulping liquor. The actual oxygen requirement can in some cases be somewhat lower or higher than the aforesaid range due to special characteristics of the spent pulping liquor or special requirements of the quality of the product. In general, the quality of the carbon product may be improved by increasing the degree of partial oxidation with reduced yield also resulting from a change of air or oxygen supply. The converse will normally occur when the air or oxygen supply is reduced relative to the supply of spent pulping liquor. It should be emphasized however that the actual yields and the quality of the carbonaceous product are also a function of the pulping liquor used and the conditions applied in the processing steps that follow the high temperature treatment and thus the above ranges may only be considered as a useful guide.

The spent pulping liquor fed to the reactor chamber in the form of a spray according to the present invention may have been pretreated for various purposes. In particular, the pulping liquor may have been treated first to produce or extract chemicals such as vanillin, and organic acids therefrom. Again, activating agents or promoters such as zinc chloride and phosphoric acids may have been added to the spent pulping liquor. Furthermore, organic materials such as bark, wood residues, molasses, or hydrocarbon type materials may have been admixed with the liquor for the purpose of increasing the yield of activated carbon.

The products of the partial oxidation in the reactor chamber are a solid carbonaceous residue and a hot gaseous product which is a mixture of water vapour and various gases usually having suspended therein some of the carbonaceous solid porducts in finely divided form. The gaseous product is removed from the reactor chamber and may be passed through cyclone separators for removal of the solid material and also may be processed for the removal of excess sensible heat such as in heat exchangers which sensible heat may be used for the preheating of the spent pulping liquor, the atomizing gas and/or the air or oxygen fed to the reactor chamber or for producing steam to be used as the atomizing gas. Finally, after removal of water vapour from the gaseous product these gaseous products may be burnt in a suitable furnace or reactor including the reactor chamber in which the partial oxidation is effected for producing more sensible heat to be used in the partial oxidation.

The finely divided solid carbonaceous residue from the reactor chamber and also if desired from the hot gaseous effluent from the reactor chamber is subjected to an aqueous leach which serves to remove the bulk of the water soluble inorganic matter consisting mainly of sodium carbonate and sodium sulphate with minor or trace amounts of sodium chlorides, sodium sulphide or sodium thiosulphate. The carbon separated from the aqueous filtrate is in active form and can be used as such or can be further treated with an aqueous acid leach which acts to further enhance the activity as well as reduce the ash content of the activated carbon produced by the water leach. The acid leached carbon is suitably washed and the activated carbon can be ground or otherwise fragmented or comminuted in the wet state or after drying to form a finely divided free-flowing powdered activated carbon. The active carbon may also be mixed with a pelletizing agent and pelletized and dried to form a pelletized activated carbon. Thus by the process of the present invention it is possible to recover the bulk of the pulping base for subsequent reuse in the pulping process.

The present invention will be further illustrated by way of the accompanying drawings in which.

Figure 1:
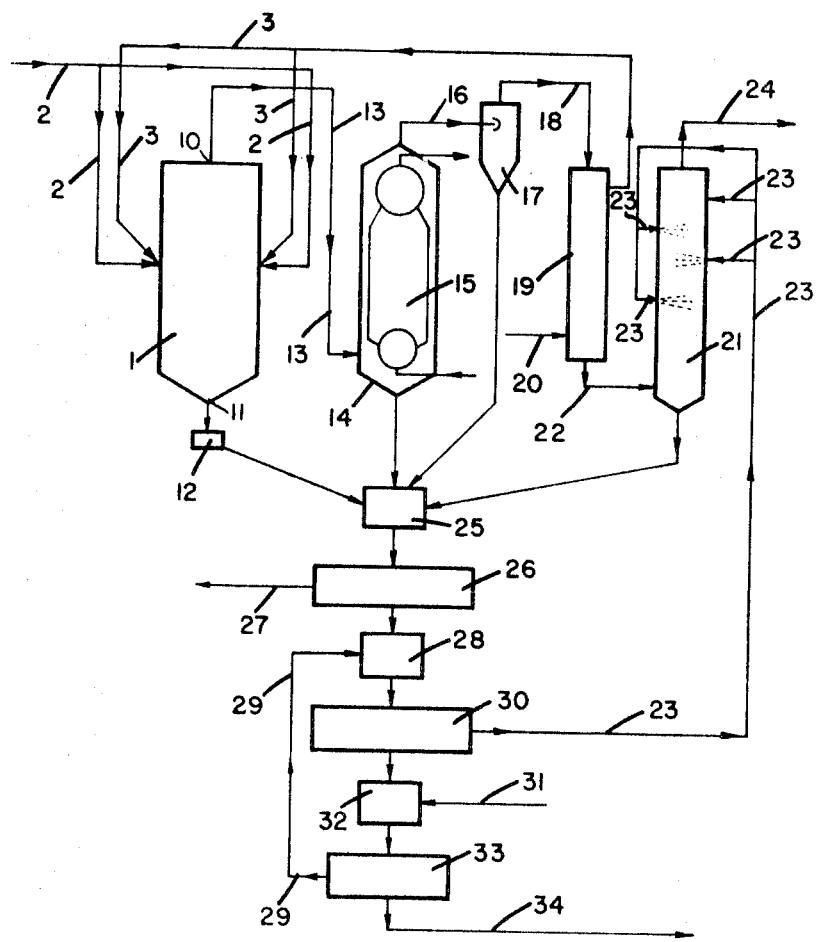
FIG. 1 is a schematic representation of the overall process according to one embodiment of the present invention.

Referring to FIG. 1, preheated spent pulping liquor is fed to a reactor chamber 1 through lines 2 and preheated air is fed to the chamber 1 through lines 3.

Figure 2:
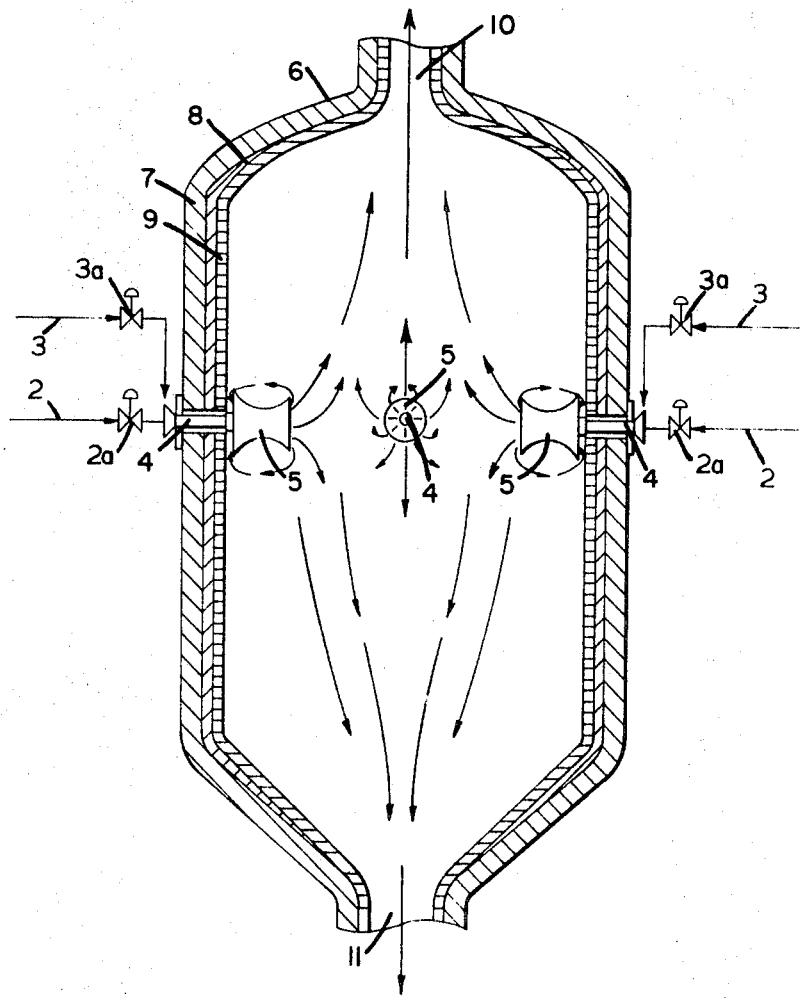
FIG. 2 is a schematic section through a high temperature reactor chamber according to one embodiment of the present invention.

Referring to FIG. 2, the preheated spent liquor and the preheated air entering through lines 2 and 3 through metering valves 2a and 3a pass through a plurality of atomizing nozzles 4 distributed in an even manner around the circumference of the side wall of the reactor chamber 1 at a single level, the nozzles 4, which are preferably pneumatic atomizing spray nozzles, having their jet axes substantially horizontal and radial and having their outlet orifices substantially even with the inside surfaces of the side walls of the chamber 1. The hot air entering through line 3 is at a sufficient pressure to inject the concentrated spent liquor into the chamber in the form of finely divided liquid droplets intimately admixed with the hot air. Concentric with the axes of each nozzle 4 and located close to the outlet orifices of each nozzle 4 is an open-ended tube 5 which assists in the recirculation of the hot gasses from near the central zone of the chamber 1 to the zone in the immediate vicinity of the spray issuing from the outlet orifice of each nozzle 4, the driving force for the recirculation being provided by the induction effect of the high velocity of the air and liquor spray jet issuing from the nozzle 4. This recircuation assists in the rapid evaporation and subsequent partial combustion of the atomized droplets of the concentrated spent liquor spray. The walls of the reactor chamber 1 are suitably formed from a mild steel shell 6, a layer of insulating brick 7, an insulated lining 8 and a heat and corrosion resistant inner wall of brick or cement 9.

Prior to introduction of the liquor spray the chamber is first brought to elevated temperature by burning auxiliary fuel through the nozzles 4 or through additional burners (not shown) located near the bottom of the chamber 1, the elevated temperature being in the range 650 to 1000° C. The combustion gasses from the burning of the auxiliary fuel are allowed to pass out of the top of the chamber 1 through the outlet 10 and the burning of the auxiliary fuel is stopped immediately before or at the time of starting to feed the spent liquor through the nozzles 4.

The products of the reaction are hot gases resulting from the partial oxidation of the spent liquor solids including all the steam formed by evaporation or by oxidation and also including a fraction of the solid residue product which due to small particle size remains suspended in the hot gas leave the reactor chamber 1 through the outlet 10. The bulk of the solid residue product in a free flowing finely divided form leaves the reactor chamber 1 through the bottom opening 11 for subsequent processing.

Referring once more to FIG. 1 the reactor chamber 1 is provided immediately below its bottom opening 11 with a water seal 12 which serves both to prevent the escape of hot gases from the chamber 1 through the opening 11 and to convert the solid carbonaceous residue product leaving through the bottom opening 11 into a slurry for subsequent further processing. The hot gases containing the suspended finely divided solid leaving the reactor chamber 1 through the outlet 10 pass through line 13 to a waste heat boiler enclosure 14 where a portion of the suspended finely divided solid is separated therefrom and the heated gases are contacted with a waste heat boiler 15 for the generation of steam. The cooled gases leaving the boiler enclosure 14 pass through line 16 to a cyclone 17 where most of the suspended finely divided solid material is separated therefrom and the gases leaving the cyclone 17 pass through line 18 to an air preheater 19 where further sensible heat is removed from the gases to preheat cold air entering through line 20 the hot air being recirculated through line 3 to the reactor chamber 1. The cooled gas is then passed through line 22 to a gas scrubber 21 where it is contacted with a dilute aqueous solution entering through line 23 for the removal of the final traces of the finely divided solid product suspended in the gases and also the removal of water vapour. The non-condensable gas which contains combustible components is then vented from the gas scrubber 21 through line 24 and can be utilized for the generation of heat by burning thereof.

The carbonaceous product in the form of a slurry from the reactor 1 and the gas scrubber 21 and in the form of a finely divided dry residue (or slurry if water used for transporting) from the boiler enclosure 14 and cyclone 17 are mixed together in a mixing chamber 25 the water serving to leach the water soluble inorganic materials from the finely divided solid material. The slurry is then passed to a filter or clarifier 26 where the aqueous solution of the water soluble inorganic material principally sodium carbonate and sodium sulphate are removed through line 27 and the filtered or settled partially leached carbon is passed to a second mixing vessel 28 for further counter-current leaching in which nearly fresh water is introduced through line 29. The counter-current leached finely divided carbon is passed through a filter or clarifier 30 where it is separated from the leaching solution which is recycled through line 23 for use in the gas scrubber 21 and the counter-current leached carbon is then subjected to a further counter-current leaching with fresh water entering through line 31 in a further mixing vessel 32. From the mixing vessel 32 the counter-current leached activated carbon is separated from the nearly fresh water in a filter or clarifier 33, the said nearly fresh water being recycled through line 29 to the mixing vessel 28 and the activated carbon being fed through line 34 for further processing such as acid leaching and/of drying or pelletizing.

Figure 3:
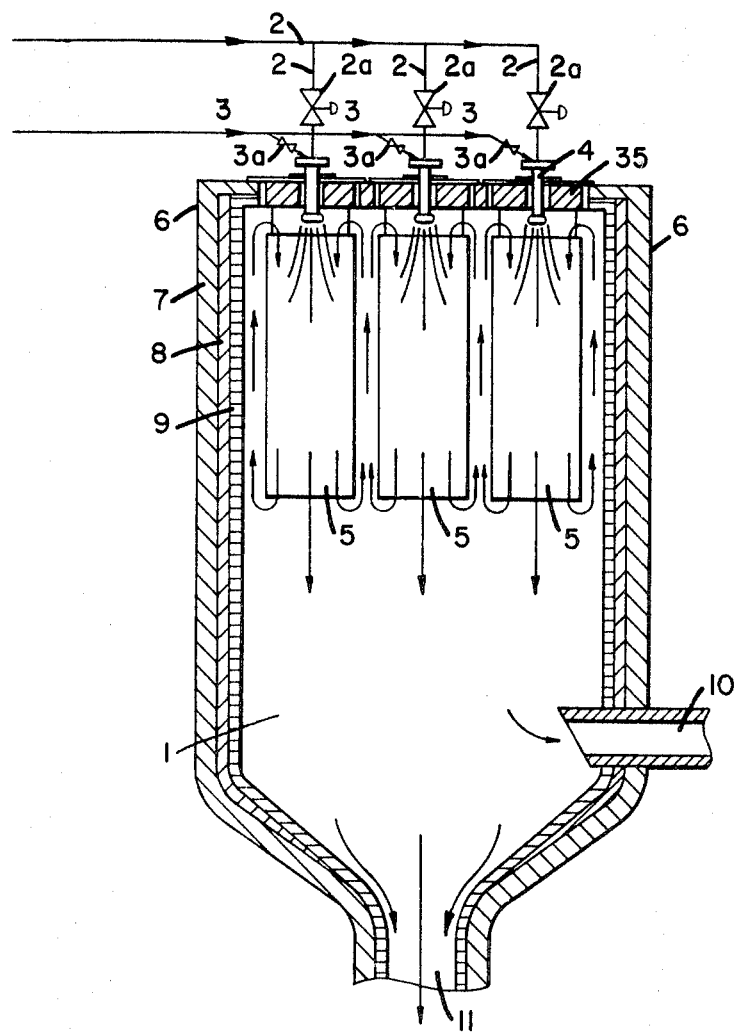
FIG. 3 is a schematic section through a reactor chamber according to another embodiment of the present invention.

Referring now to FIG. 3 the reactor chamber 1 is a similar bricklined steel encased chamber having a side wall formed in a similar manner as in FIG. 2 from a mild steel shell 6, insulating bricks 7, insulating lining 8 and heat and corrosion resistant bricks or cement 9. However, in contrast to FIG. 2 the hot spent liquor feed entering through line 2, the metering valves 2a and the hot air entering through line 3, valves 3a, pass through the spray nozzles 4 distributed evenly in an insulated top cover 35 such that the axes of the nozzles are vertical and the outlet orifices are substantially flush with the underside of the cover 35, the nozzles 4 serving to inject the liquor or mixtures thereof into the chamber in the form of the finely divided liquor droplets through induction tubes 5. The hot gases produced by the partial oxidation of the finely divided spent liquor exit through line 10 in the side wall of the reactor chamber 1 and the solid carbonaceous residuce exits through the outlet 11.

Figure 4:
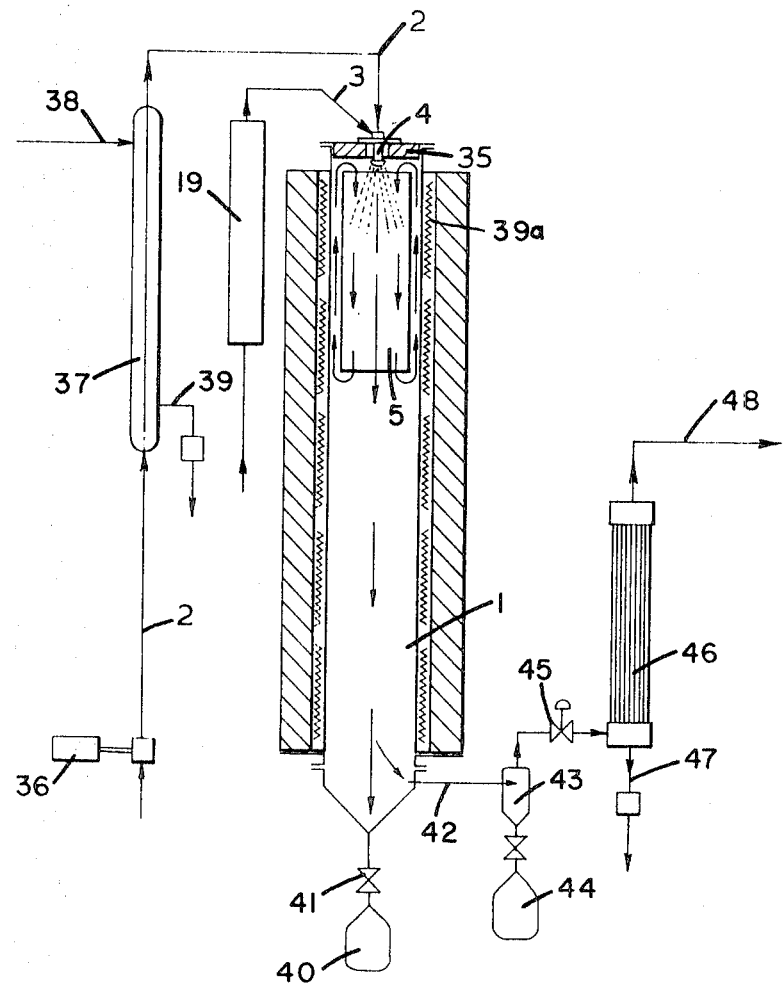
FIG. 4 is a schematic section through a reactor chamber according to a third embodiment of the present invention.

Referring now to FIG. 4 the concentrated spent liquor 2 is pumped by a pump 36 through line 2 through a preheater 37 where it is in heat exchange with steam entering through line 38 and exiting through line 39 and the hot spent liquor then passing through line 2 to the atomizing nozzle 4 in the top cover 35 of a tubular reactor chamber 1, the spray passing downwardly through the reactor chamber through the induction tube 5. Cold air passing through line 3 is heated in an air preheater 19 and the hot air is fed through line 3 to the nozzle 4 under pressure to produce said atomized spray. The temperature in the reactor vessel 1 is initially brought up to the required level by the resistance heaters 39a located outside the walls of the reactor chamber 1. From the reactor chamber 1 part of the solid carbonaceous product is removed to a receiver 40 through line 41 and the hot gaseous products are removed through line 42 to a cyclone separator 43 where the finer fraction of the solid product is separated and passed to a receiver 44, the hot gases then passing, through line 45 to a condenser 46, the condensate being removed through line 47 and the gaseous product passing through line 48 for burning to produce more heat for use in the process or elsewhere.

It will be realized that in FIGS. 2 and 3 and 4 the hot gaseous products and the solids residue can be removed from the reactor chamber 1 through a single opening and subsequently separated for further treatment.

It will be seen from the accompanying drawings therefore that the present invention provides a process for producing a carbonaceous solid residue in finely divided form which obviates the need for disintegration of the solid residue product as is required by the most widely used existing method to assist in the subsequent leaching operation. Further, the process of the present invention may be effected in such a manner that the total heat requirement of the high temperature processing stage is provided by partial oxidation of the organic material in the spent pulping liquor and there is no need for auxiliary heating in the process.

The present invention will be further illustrated by way of the following examples.

EXAMPLE 1

Operating with the equipment shown in FIG. 4 of the accompanying drawings the reactor was constructed with a 15-foot long tubular reactor chamber with an internal diameter of 12 inches, and was equipped with 6 independently controlled resistance heaters so as to preheat the reactor to the required starting temperature or temperature profile prior to introduction of the spent pulping liquor in the production of the activated carbon. The reactor was equipped with a two fluid atomizing nozzle (Spraying System Type 1/4 J, fluid nozzle 1650, air nozzle 120) concentrically located on the top plate of the reactor and a cylindrical induction tube 5 of 10 inch diameter and 5 feet length, was located coaxially under the nozzle 4 with a gap of 2.5 inches between the bottom face of the cover plate and the top of the induction tube for the entry of recirculating hot gases passing upwards in the 1-inch annulus between the wall of the reactor and the induction tube. While feeding 976 standard cubic feet (32° F.) per hour of air at 60 p.s.i.g. pressure and preheated to a temperature of 230° C. the reactor was heated to a uniform wall temperature of 725±10° C. When the required temperature was attained water was fed through the atomizing nozzle at the rate of 40 lbs. per hour until the reactor pressure was adjusted to 10 p.s.i.g., the conditions were then stabilized and the liquid feed was switched to concentrated spent kraft pulping liquor having a 66.1% by weight solids at the rate of 55.2 lbs. per hour preheated to a temperature of 130° C. at the nozzle. After 20 minutes of operation in this manner the reactor heaters were shut off and the reaction was allowed to proceed in a completely thermally self-sufficient manner. The solids products were periodically collected during the process from the conical bottom of the reactor and the adjacent cyclone separator in the proportions 80:20 by weight respectively, with 94% overall collection efficiency. This collection efficiency could be increased by the use of a suitable combination of scrubbers, bag-filters or electrostatic precipitators, in addition to or in place of the cyclone separators in commercial installations. Sulphuric acid leaching of the solid product, followed by a hot water wash, drying at 110° C. and limited pulverizing (in a mortar) produced an active carbon with excellent adsorptive capacity, which was determined at room temperature using a 1.0 gram per litre methylene blue chloride (0.84 gram per litre of methylene blue dye) solution, with 30 minutes of mixing of varying amounts of carbon in the form of dilute slurries. The amount of methylene blue dye adsorbed by the carbonaceous product collected after 50 minutes of thermally self-sufficient operation of the reactor at a maximum temperature of 735° C. on the induction tube and 725 to 680° C. decreasing from top to the bottom on the reactor wall was found to be 204 mg. per gram of carbon, when the residual methylene blue dye concentration in the filtered solution was 84 mg. per litre. This amount of methylene blue adsorbed was about 40 percent higher than that measured for two different commercially available active carbons using the same methylene blue solution and the same method of testing, to the same level of residual methylene blue concentration (90% adsorption). The yield of carbon produced was calculated to be 11.2% by weight of the original organic material fed, on a no-loss, i.e. 100% recovery basis.

The analysis of the inorganic portion of the reactor solid product (89.8% by weight of the total reactor solid product) showed 20% by mol of sodium sulphate, with the balance essentially pure sodium carbonate. Thus, when the leaching is carried out first with one or two stages of hot water wash, followed if desired, by an additional acid leaching stage, the bulk of the inorganic material can be recovered as technical grade sodium carbonate solutions and utilized as part of the make up chemical for the preparation of the pulping liquor, for either a kraft or sulphite type pulping operation. The dry gas product of the reaction contained 20% by volume of combustible gases, i.e. hydrogen, carbon monoxide, methane and some higher hydrocarbons including 0.32% by volume of hydrogen sulphide. The calculated lower heating value of this gas was 79 b.t.u. per s.c.f. (32° F.) suitable for utilization in special burners with preheating of the gas and/or air particularly in furnaces where this gas could contribute only a fraction of the total heat requirement. The gas, when supplemented by high heating value fuel could also be used for supplying the heat requirements of the drying of the leached, filtered activated carbon product. The overall heat balance of example, based on the high heating values of the feed solids (5600 B.t.u. per pound of feed of solids), produce gas (89 B.t.u. per s.c.f. 32° F.) and leached activated carbon (13,000 B.t.u. per pound) indicates that the degree of partial oxidation in the above experiment was 41%. The relatively high degree of partial oxidation required for thermal self-sufficiency at around 730° C. reaction temperature in this case was primarily due to the very poor insulation of the top section of the reactor used in the experiment. This had some adverse effect on the yield of activated carbon and the heating value of the product gas as well.

EXAMPLE 2

The experiment was carried out under conditions which would correspond to thermal self-sufficiency in a reactor better insulated in the top section than the one actually used. A lower degree of partial oxidation was applied and the heat required for maintaining a reactor wall temperature of 725±10° C. was supplied by the heaters.

The equipment and the experimental procedures, including the activity tests on the carbon product were the same as described in Example 1. The feed material (kraft black liquor) was from the same drum, but on extended heating it concentrated to 71.5 percent by weight solids content. The spent liquor feed rate was 55.2 pounds per hour, the air rate 721 standard cubic feet (32° F.) per hour at about 80 p.s.i.g. pressure and 232° C. temperature at the feed nozzle. The reactor was operated at 10 p.s.i.g. pressures. About 72 percent by weight of the solid product actually recovered, containing the activated carbon, was collected from the conical bottom of the reactor, the balance from the cyclone separator. Overall collection efficiency was about 90%. The yield of activated carbon obtained from samples taken after 65 minutes of operation in the above described manner was calculated to be 20.1% by weight of original organic material fed, again on a no-loss (100% recovery) basis. The adsorptive capacity of the leached carbon was 220 mg. of methylene blue dye per gram of carbon, under the same test conditions as described in Example 1. The sodium sulphate content of the inorganic fraction of the solid product of partial oxidation reaction (representing 83.2% by weight of the solid product) was 17.7% by mol. This was lower than the product from the experiment described in Example 1, while the $H_2S$ concentration in the gaseous product was higher (0.53% by volume vs. 0.32 in Example 1) reflecting the generally lower degree of partial oxidation of the reactants. Thermal balance made on the feed and product materials showed an overall degree of partial oxidation of 34%. The lower heating value of the dry gases produced was also better, 102 B.t.u. per s.c.f. (32° F.), due to the higher concentration of combustible gases, 25% by volume instead of 20% in Example 1. Heat balance made on the reactor showed that the heat generated inside the reactor was still in excess of the net heat requirement of the reaction, and at the important top section, about one-third of the heat losses were provided by the reaction, while two-thirds was supplied by the heaters. On this basis, it is reasonable to assume that in a better insulated reactor the conditions prevailing in this and numerous other experiments made under similar conditions with other spent liquors, would represent thermally self-sufficient conditions.

It should be remarked here that the spent liquor used in the experiments described here had somewhat higher ash and considerably higher initial sodium sulphate content than the other kraft or sulphite liquor tested in the same series of experiments. This accounts for a higher than typical sulphate content of the inorganic fraction of the solid product. With the other kraft liquors, the sodium sulphate content of the inorganic product was found to be 10–14% by mol, the actual value depending on the operating conditions, primarily the overall degree of partial oxidation. With other types of sodium base spent liquors, the sodium sulphate content of the inorganic product was very much a function of the original sodium to total sulphur and sodium to sulphate sulphur molar ratios. However, the sulphate content of the inorganic product of the partial oxidation process used primarily for producing activated carbon corresponded to 20 to 60 percent of the total sulphur fed, with the rest of the sulphur appearing mostly as hydrogen sulphite in the gas phase product. The actual sulphate content of the inorganic product will of course influence the choice of point of entry of the sodium carbonate-sodium sulphate mixture into the pulping liquor cycle.

We claim:

1. A process for the production of finely divided carbon, activatable by aqueous and/or acid leaching, from concentrated spent cellulose pulping liquor in a single high temperature stage and in a thermally self-sufficient manner which process comprises passing the spent liquor and an atomizing gas under pressure through at least one atomizing nozzle into a reactor chamber to form at least one high velocity atomized spray of finely divided liquid droplets and intimately admixing a free oxygen containing gas therewith in an amount sufficient to effect a selective partial oxidation of the carbonaceous material in said liquor, said reaction chamber being maintained at a sufficiently high temperature for thermal self sufficiency as a result of said selective partial oxidation, each atomized spray being passed in said chamber through an open-end tube substantially coaxial with said spray and spaced from but adjacent to each spray nozzle to cause recirculation, by induction, of a portion of the hot gaseous products of said partial oxidation to said spray adjacent said nozzle whereby to effect rapid evaporation of said pulping liquor and to maintain the reaction temperature of said partial oxidation of the carbonaceous material in said liquor.

2. A process as claimed in claim 1 in which the atomizing gas contains an oxygen containing gas.

3. A process as claimed in claim 1 in which the atomizing gas is the oxygen containing gas.

4. A process ac claimed in claim 1 in which the atomizing gas is a non-reactive gas, the oxygen containing gas being introduced independently into the spray.

5. A process as claimed in claim 4 in which the atomizing is steam.

6. A process as claimed in claim 1 in which the atomizing gas is preheated to a temperature in the range of 100 to 300° C.

7. A process as claimed in claim 1 in which the oxygen containing gas is preheated to a temperature in the range 100 to 300° C.

8. A process as claimed in claim 1 in which the oxygen containing gas is air or oxygen.

9. A process as claimed in claim 1 in which the concentrated spent pulping liquor is preheated to a temperature in the range 100 to 175° C.

10. A process as claimed in claim 1 in which the atomizinng gas is fed to each atomizing nozzle at a pressure at least twice the absolute pressure in the reactor.

11. A process as claimed in claim 1 in which the pressure in the reactor is in the range 10 to 30 p.s.i.a. and the atomizing gas is fed at a pressure in the range 30 to 250 p.s.i.a.

12. A process as claimed in claim 1 in which the reactor is maintained at a temperature in the range 650 to 1000° C.

13. A process as claimed in claim 1 in which the spent liquor contains at least 1% sodium or potassium and the temperature in the reactor is in the range 650 to 850° C.

14. A process as claimed in claim 1 in which the spent liquor contains at least 1% calcium or magnesium and the temperature in the reaction chamber is maintained in the range 700 to 1000° C.

15. A process as claimed in claim 1 in which the solids content of the concentrated liquor is in the range 50 to 75%.

16. A process as claimed in claim 1 in which the proportion of oxygen containing gas is such as to correspond to 25 to 50% of the stoichiometric oxygen required for the full combustion of the organic content of the spent liquor.

17. A process as claimed in claim 1 in which at least part of the spent pulping liquor is injected into the reaction to form at least one spray directed downwardly from the top of the reactor.

18. A process as claimed in claim 1 wherein at least a portion of the spent pulping liquor is injected into the reactor to form an atomized spray directed in a substantially radial and horizontal direction in the reactor.

19. A process as claimed in claim 1 in which the hot gaseous products of the reactor chamber are treated for recovery of heat therefrom.

20. A process as claimed in claim 1 in which the hot gaseous products from the reaction chamber are treated for the recovery of heat therefrom which recovered heat is used for generating or preheating the atomizing gas and/or preheating the oxygen containing gas.

21. A process as claimed in claim 20 in which the cooled gaseous products are treated for removal of water vapour therefrom and combusted to produce further heat.

22. A process as claimed in claim 1 in which the gaseous products from the reactor chamber are treated for the recovery of suspended finely divided solid products therein.

23. A process as claimed in claim 1 in which the solid carbonaceous products from the reactor chamber are subjected to an aqueous leach to improve the activity of the finely divided carbon.

24. A process as claimed in claim 23 in which the leached finely divided carbon is subjected to an acid leach followed by washing thereof.

25. A process as claimed in claim 1 in which activating agents "from the group consisting of zinc chloride and phosphoric acids" have been added to the spent pulping liquor prior to partial oxidation.

26. A process as claimed in claim 1 wherein organic material "from the group consisting of bark, wood residues, molasses, and hydrocarbons" has been added to the spent pulping liquor prior to the partial oxidation.

27. A process as claimed in claim 1 in which the spent liquor contains at least 1% sodium or potassium and the temperature in the reactor is in the range 700 to 800° C.

28. A process as claimed in claim 1 in which the spent liquor contains at least 1% calcium or magnesium and the temperature in the raction chamber is maintained in the range 800 to 950° C.

References Cited

UNITED STATES PATENTS

| | | | |
|---|---|---|---|
| 1,462,752 | 7/1923 | Jacobs | 252—421 |
| 2,056,746 | 10/1936 | Strupp | 162—30 |
| 2,391,566 | 12/1945 | Goodell | 162—30 |
| 2,535,730 | 12/1950 | Gadret | 23—48 |
| 2,591,188 | 4/1952 | Nilsson | 23—48X |
| 3,073,672 | 1/1963 | Cederquist | 162—31X |
| 3,111,378 | 11/1963 | Mugg | 23—48 |
| 3,250,598 | 5/1966 | Kennedy | 23—277 |
| 3,333,917 | 8/1967 | Bergholm | 23—48 |

DANIEL E. WYMAN, Primary Examiner

P. E. KONOPKA, Assistant Examiner

U.S. Cl. X.R.

23—48, 209.5, 209.6, 277; 162—30; 252—423, 425, 445